W. S. PORTER & C. A. WINN.
BALL AND SOCKET JOINT.
APPLICATION FILED JAN. 5, 1912.

1,123,796. Patented Jan. 5, 1915.

WITNESSES:

INVENTORS
Charles A. Winn
William Sherwood Porter
BY
Offield, Towle, Graves & Offield.
ATTORNEYS

UNITED STATES PATENT OFFICE.

WILLIAM S. PORTER AND CHARLES A. WINN, OF CHICAGO, ILLINOIS; SAID WINN ASSIGNOR TO SAID PORTER.

BALL-AND-SOCKET JOINT.

1,123,796. Specification of Letters Patent. Patented Jan. 5, 1915.

Application filed January 5, 1912. Serial No. 669,663.

*To all whom it may concern:*

Be it known that we, WILLIAM S. PORTER and CHARLES A. WINN, citizens of the United States, residing in the city of Chicago, county of Cook, and State of Illinois, have invented certain new and useful Improvements in Ball-and-Socket Joints, of which the following is a specification.

The principal object of our invention is to produce a ball and socket joint of great strength and durability and one in which the parts move freely at all angles relative to each other, with no liability of binding.

To these ends the invention consists of the device shown in the accompanying drawing, in which—

Figure 1:
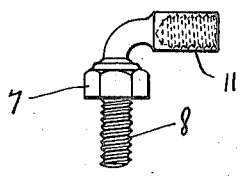
Figure 2:
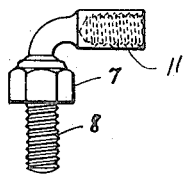
Figure 5:
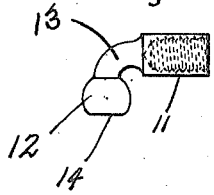
Figure 3:
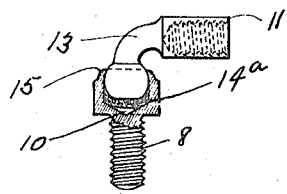
Figure 4:
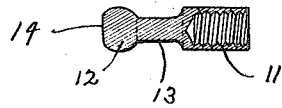

Figures 1 and 2 are side elevational views of our device; Fig. 3 is a similar view but with the socket member in section. Fig. 4 is a longitudinal sectional view of the ball member with the neck straight; Fig. 5 is a side view of the ball member.

Referring now more particularly to the drawings, the socket member preferably consists of a bolt having a head 7 and a screw-threaded shank 8, the head being suitably recessed forming a socket 9, the bottom of which is concave as shown at 10. The ball member consists of an attaching portion 11, a ball 12 and a neck 13 formed integral with the attaching member and ball. The ball has preferably a flat portion 14, the purpose of which will be hereinafter described. In the device shown the socket member is adapted to be rigidly secured to an object capable of being moved while the ball member is intended to have a lever secured to the attaching portion 11 thereof, whereby the motion of the lever will be transmitted through the ball and socket joint to the member to which the socket member is attached. It is obvious that a lever might be attached to the socket portion and the part to be moved secured to the attaching end of the ball portion.

Where it is desired to obtain an angular throw of the member to which the socket is attached, or to move such member in an arc, it is necessary to have a curved neck 13 to obtain such angular movement. Heretofore it has been difficult to construct a device with a curved neck portion that would withstand the strain to which such a device is subjected. This was primarily due to the fact that the neck portions were tapered, the thickest portion being where the neck joined the attaching member and the thinnest portion at the juncture of the ball and neck. When strain was put upon the neck portion, it would break the neck in a comparatively short time at its weakest point, because the strain always came on the thinnest portion of the neck. In our device, however, we make the neck of substantially the same thickness throughout its length (as clearly shown in Fig. 4) so that the strain does not come upon any single point in the neck when the device is operated. Furthermore, the bending of the neck condenses the particles of metal therein, thereby strengthening one portion to compensate for the weakening of the other portion due to the stretching of the metal and at the same time maintaining a uniform thickness throughout its length.

By forming the socket with a concave lower wall and by also flattening one end of the ball, there is no liability of the ball and socket binding when one is moved relative to the other. It is desirable to have the ball member remain in the angular position in which it is placed and to this end we insert a leather or other suitable form of semi-resilient packing 14$^a$ in the socket member against which the ball presses and which normally keeps the ball member in close contact with the upper inturned edges 15 of the socket. When the packing 14$^a$ is used it is always desirable to have the lower portion of the socket cut away as shown at 10 to provide space in which the packing may be compressed on movement of the ball, and it is especially desirable to provide the packing with some form of lubricant, although when leather is used, there is a sufficient amount of oil in itself to provide the necessary lubricant.

It will be understood that the side walls of the socket are initially formed substantially parallel to receive the ball and are then turned or swaged over against the wall to form the annular seat to conform to the contour of the ball itself.

Having now described our invention, we claim:

In a ball and socket joint, the combination of an integral ball member comprising a solid ball, a reduced neck extending therefrom, and a sleeve extending from the neck, an integral socket member comprising a socket part and a screw threaded shank extending therefrom, the edge of the socket being deflected inwardly to lock the ball therein, the bottom of said socket being concave and the side of the ball opposite its juncture with the neck being flat, and a flat leather washer spanning the concavity of the socket and engaging against the flat surface of the ball, said washer acting as a resilient packing to hold the ball in close contact with the socket retaining edge, and said concavity allowing deflection of the washer when the joint parts are relatively moved, said washer acting also as a natural lubricant for the engaging surfaces.

WILLIAM S. PORTER.
CHARLES A. WINN.

Witnesses:
FRANK L. BELKNAP,
JAMES R. OFFIELD.